Patented Nov. 7, 1950

2,529,315

UNITED STATES PATENT OFFICE 2,529,315

AMINE ACTIVATED EMULSION POLYMERIZATION PROCESS

George E. Serniuk, Roselle, N. J., assignor to Standard Oil Development Company, a corporation of Delaware No Drawing. Application December 30, 1944, Serial No. 570,747

1 Claim. (Cl. 260—83.1)

This invention pertains to the manufacture of synthetic rubber-like materials and in particular to the preparation of such materials by the polymerization of certain unsaturated materials in aqueous emulsion.

Synthetic rubber-like materials have been prepared by polymerizing one or more conjugated diolefins or by interpolymerizing one or more conjugated diolefins with copolymerizable materials containing a single C=C group such as styrene, substituted styrenes, acrylonitrile, methacrylonitrile, acrylic acid esters, unsaturated ketones and the like in aqueous emulsion, using a compound capable of liberating oxygen under the reaction conditions such as hydrogen peroxide, benzoyl peroxide and alkali metal or ammonium persulfates and perborates as catalysts.

As ordinarily carried out, the reactants are emulsified in from an equal to a two-fold quantity of water using as the emulsifier water-soluble soaps such as the alkali metal or ammonium oleates and stearates as well as various surface active agents such as salts of alkylated naphthalene sulfonic acids, salts of aliphatic and olefinic sulfonic acids, salts of fatty alcohol sulfuric acid esters and also acid addition salts of high molecular weight alkyl amines. A polymerization catalyst such as potassium persulfate and preferably a suitable polymerization modifier is added and the mixture maintained under agitation at temperatures of from about 20-60° C. for a period sufficient to permit at least about 70% of the monomer materials to become converted to a high molecular weight polymer. The polymers formed vary from hard, resinous materials to soft, rubber-like materials depending upon the particular monomers and the proportions in which they are used and the reaction conditions applied. In general, soft rubbery polymers result when the diolefin is the preponderant polymerizable material, provided, of course, that other reaction conditions are right.

In the polymerization or copolymerization of conjugated diolefin hydrocarbons in aqueous emulsion the reaction times have been found to be rather long to reach approximately 70-75% conversion of the monomeric materials used when using reaction temperatures in the range of 25-40° C. Attempts have been made to speed up the rate of reaction as by raising the temperature at which the reaction is conducted, but this, in general, has resulted in inferior polymerizates. Certain materials which have a modifying effect upon the polymerization to give more plastic polymers also have a promoting effect. Such materials include primary, secondary and tertiary alkyl and aralkyl mercaptans used preferably in the presence of a peroxide or per-salt. (Certain promoters such as carbon bisulfide, aldehydes, oxides and salts of polyvalent metals have been proposed but use of such materials has not made possible the desired rates of reaction in the temperature range of about 20-40° C.) The most generally used polymerization modifiers are the aliphatic mercaptans containing more than six and preferably about twelve carbon atoms per molecule. Although these mercaptans promote or increase the speed of reaction as well as cause the formation of more plastic polymers, there is still a demand for other and improved types of promoting agents.

It is the object of this invention to provide the art with a novel method of activating emulsion polymerization reactions.

It is also the object of this invention to activate the emulsion polymerization of conjugated diolefins or of mixtures of conjugated diolefins with certain copolymerizable compounds without detrimentally affecting the polymer product quality.

It is also an object of this invention to provide a new class of compounds which act as polymerization promoters and which can also be used in conjunction with known types of promoters and modifiers in the emulsion polymerization of conjugated diolefins or active monoolefins of the vinyl type, or of mixtures of conjugated diolefins with certain unsaturated compounds which are copolymerizable with conjugated diolefins.

These and other objects will appear more clearly from the detailed specification and claim which follow.

It has now been found that the production of synthetic rubber-like materials by the emulsion polymerization of conjugated diolefins, or mixtures of conjugated diolefins with certain copolymerizable compounds takes place at a much faster rate and/or at lower temperatures without injury to the product quality if an amino compound such as water-soluble, primary, secondary, tertiary amines and polyamines, preferably aliphatic, alicyclic or heterocyclic amines and derivatives such as hydroxy amines wherein the OH group is attached to a carbon atom, amino ethers, salts of amines such as hydrochloride, sulfates, etc., chloro amines and the like are used in low concentrations in the reaction mixtures.

My invention is applicable to the production of emulsion polymers of conjugated diolefins such as butadiene, isoprene, piperylene, dimethyl butadiene, as well as of other double bond containing compounds such as chloroprene, methyl pentadiene, cyanoprene, phenyl butadiene and the like taken singly or in combination, to the production of copolymers of one or more of such diolefins with a copolymerizable compound containing a single C=C linkage such as acrylonitrile, methacrylonitrile, acrylic acid esters such as methyl acrylate and methyl methacrylate, fumaric acid esters such as ethyl fumarate and unsaturated ketones such as methyl vinyl ketone, methyl isopropenyl ketone and the like or to the polymerization of one or more active monoolefins of the unsaturated type such as the foregoing nitriles, ketones and esters.

The polymerization is ordinarily effected by dispersing one part of the monomer or monomer mixture in from about one to about two parts of water containing a suitable emulsifying agent and a polymerization catalyst. A suitable polymerization modifier or promoter may also be provided in the reaction mixture if desired.

The emulsifiers employed are the alkali metal or ammonium salts of higher molecular weight fatty acids such as oleic acid, stearic acid, palmitic acid, as well as mixtures of fatty acids such as are obtained by the selective hydrogenation of tallow acids and also surface active compounds such as the alkali metal salts of sulfonic acid of fatty alcohol sulfates, for example, sodium salts of isobutylnaphthalene sulfonic acid or tetraisobutenyl sulfonic acid, sodium dodecyl sulfate and also acid addition salts of high molecular weight alkyl amines such as dodecyl amine hydrochloride or acetate. The amount of emulsifier used is ordinarily between about 0.5 to about 5 weight percent based upon the monomers used.

The catalysts which are used are substances which are capable of liberating oxygen under the conditions employed in the polymerization and include such compounds as hydrogen peroxide, benzoyl peroxide, hydrogen peroxide addition compounds, hydrogen peroxide with metal activators, tertiary butyl hydroperoxide, perborates, persulfates and organo metallic compounds such as iron carbonyl. The amount of catalyst used is ordinarily about 0.05 to about 0.6 weight per cent based upon the monomers present.

The amino compounds which may be used as polymerization promoters in accordance with the present invention are water-soluble primary, secondary and tertiary amines and water-soluble derivatives thereof having an ionization constant of at least about $1 \times 10^{-5}$ and morpholine which has an ionization constant of $2.44 \times 10^{-6}$. The most active of these compounds are the aliphatic, alicyclic or heterocyclic amines of about 2-6 carbon atoms, such as monoethyl amine, diethyl amine, diethyl amino ethanol, piperidine and morpholine. The use of piperidine as polymerization promoter is further described and claimed in divisional application Serial No. 166,760, filed on June 7, 1950. Other amines and derivatives which may be used in accordance with this invention are methyl, propyl, butyl, amyl, hexyl, dipropyl, dimethyl-ethyl and trimethyl amines and tetraethyl ammonium hydroxide, pyrrolidine, piperazine, indole, carbazole, beta piperidinopropionitrile, mono-, di- and tri-ethanolamine and the methyl or ethyl ethers of dimethyl- or diethylamino ethanol, chloromethyl amine, chlorobutyl amine and the like. The amine promoters are preferably used in amounts of about 0.05 to about 0.5% by weight based upon the reactants.

The amine type promoters are advantageously used in combination with polymerization modifiers, particularly aliphatic mercaptans containing at least six carbon atoms such as heptyl, octyl, diisobutyl, dodecyl or Lorol mercaptan or xanthogen polysulfides such as diisopropyl xanthogen disulfide. In lieu of the mercaptan, I may also use certain mercaptan-vinyl compound addition products such as are obtained by reacting primary, secondary or tertiary mercaptans of varying molecular weight with methacrylonitrile vinyl compounds such as acrylonitrile, vinyl ethers, vinyl ketones and the like.

The following examples are illustrative of the present invention but it is to be understood that my invention is not limited thereto:

EXAMPLE 1

Several emulsion polymerization experiments were made in which butadiene and acrylonitrile were copolymerized in emulsion using a persulfate-mercaptan combination in conjunction with morpholine as a promoter in accordance with the present invention. The following recipe was used:

| | | |
|---|---|---|
| Water | parts | 200 |
| Soap | do | 4 |
| Mercaptan $C_{12}$-$C_{14}$ | do | 0.5 |
| Potassium persulfate | do | 0.3 |
| Acrylonitrile | do | 26 |
| Butadiene | do | 74 |
| Morpholine | | variable |
| Reaction temperature | °F | 77 |
| Reaction time | hrs | 14¾ |

The results obtained are summarized in Table I below from which it may be seen that morpholine in a concentration as low as 0.05% based upon the reactants has a very definite promoting effect upon the reaction. Although a concentration of 0.8% of morpholine is about equally effective as 0.1% as far as promoting the reaction is concerned, it will be shown in Example 2 below that the use of larger amounts of amine is detrimental from the standpoint of product quality.

TABLE I

*Per cent conversion vs. morpholine concentration in the synthesis of acrylonitrile-butadiene copolymers*

| Per Cent Morpholine (Based on reactants) | Per Cent Conversion |
|---|---|
| 0 | 50 |
| 0.05 | 84 |
| 0.1 | 91 |
| 0.2 | 94 |
| 0.4 | 95 |
| 0.8 | 93 |

Similar results were obtained (i. e. 90% conversion) after 15½ hours at 25° C. when 0.2% of morpholine was used as a promoter and sodium lauryl sulfate was used as the emulsifier instead of the soap.

EXAMPLE 2

Two runs were carried out in a 3 gallon stainless steel reactor equipped with internal agitation. Each reaction charge was as given in Example 1, using a total charge of 3 kg. of monomers. One run was made using 0.4% of morpholine, while in the other run only 0.1% was used. The results are summarized in Table II below from which it may be seen that the run with the larger amount of morpholine resulted in a less plastic product. Thus, although the concentration of the amine promoter is not critical from the standpoint of reaction rate, the concentration must be kept to a minimum in order to get products of good plasticity. By using larger concentrations of mercaptan modifier with the amine, it is possible to prepare polymers having Mooney viscosities as low as 50 or less.

TABLE II

| Per Cent Morpholine | Temperature, °C. | Time, Hours | Per Cent Conv. | Mooney Viscosity | |
|---|---|---|---|---|---|
| | | | | 1' | 4' |
| 0.1 | 24 | 13½ | 75 | 134 | 132 |
| 0.4 | 24 | 10 | 75 | 153 | 163 |

EXAMPLE 3

A number of experiments similar to those carried out in Example 1 were made substituting methyl isopropenyl ketone for the acrylonitrile and piperidine for morpholine. The data from these experiments are summarized in Table III below. It may readily be seen therefrom that the addition of piperidine to the reaction mixture brought about increases in conversion from about 12–16% to about 90% when mercaptan modifiers were present and from about 40% to 60% when isopropyl xanthogen disulfide was present.

TABLE III

*Copolymerization of butadiene and methyl isopropenyl ketone using piperidine as promoter*

| Experiment No. | 1 | 2 | 3 | 4 | 5 | 6 | 7 | 8 |
|---|---|---|---|---|---|---|---|---|
| Water, cc. | 400 | 400 | 400 | 400 | 400 | 400 | 400 | 400 |
| Soap Flakes, Gms. | 10 | 10 | 10 | 10 | 10 | 10 | 10 | 10 |
| Methyl Isopropenyl Ketone, Gms. | 50 | 50 | 50 | 50 | 50 | 50 | 50 | 50 |
| Primary Mercaptan, $C_{12}$–$C_{14}$, Gms. | 0.9 | 1.1 | 1.5 | 0.9 | 1.1 | 1.5 | | |
| Isopropyl Xanthogen disulfide, Gms. | | | | | | | 1.0 | 1.0 |
| Potassium Persulfate, Gms. | 0.6 | 0.6 | 0.6 | 0.6 | 0.6 | 0.6 | 0.6 | 0.6 |
| Butadiene–1,3, Gms. | 150 | 150 | 150 | 150 | 150 | 150 | 150 | 150 |
| Piperidine, cc. | | | | 0.5 | 0.5 | 0.5 | | 0.5 |
| Reaction Time, Hrs. | 18½ | 18½ | 18½ | 18½ | 18½ | 18½ | 22½ | 22½ |
| Reaction Temp., °C. | 40 | 40 | 40 | 40 | 40 | 40 | 40 | 40 |
| Product, Gms. | 24 | 24 | 32 | 177 | 178 | 182.5 | 79.5 | 120 |
| Conversion, Per cent | 12 | 12 | 16 | 88.5 | 89 | 91.2 | 39.7 | 60 |
| Plasticity of Polymer | A | A | A | A | A | A | B | B |

A = Not plastic.
B = Quite plastic.

EXAMPLE 4

Similar experiments were conducted to determine the effectiveness of piperidine on the polymerization of butadient, the data from which are contained in Table IV.

TABLE IV

*Piperidine as promoter in the preparation of polybutadiene in emulsion*

| | | |
|---|---|---|
| Water, cc. | 400 | 400 |
| Soap flakes, gms. | 10 | 10 |
| Tertiary $C_{12}$ mercaptan, cc. | 1.3 | 1.3 |
| Potassium persulfate, gms. | 0.5 | 0.5 |
| Butadiene-1,3, gms. | 200 | 200 |
| Piperidine, cc. | | 1.0 |
| Reaction time, hrs. | 12 | 12 |
| Reaction temperature, °C. | 60 | 60 |
| Product, gms. | 180 | 166 |
| Conversion, percent | 90 | 83 |

EXAMPLE 5

A series of runs were made preparing emulsion copolymerizates of butadiene and acrylonitrile using varying amounts of piperidine. The following recipe was used:

| | | |
|---|---|---|
| Water | parts | 200 |
| Soap | do | 4 |
| Mercaptan $C_{12}$–$C_{14}$ | do | 0.5 |
| Potassium persulfate | do | 0.3 |
| Acrylonitrile | | 26 |
| Butadiene | | 74 |
| Piperidine | | variable |
| Reaction temperature | °F | 84 |
| Reaction time, hr. | | 14.75 |

The results of these runs are summarized in Table V below from which it may be seen that about 0.3% of piperidine is optimum for this reaction system.

TABLE V

*Per cent conversion vs. piperidine concentration in the synthesis of acrylonitrile-butadiene copolymers*

| Piperidine, Per Cent on Reactants | Conversion, Per Cent |
|---|---|
| 0. | 62.3 |
| 0.05 | 72.5 |
| 0.10 | 77.5 |
| 0.20 | 83.9 |
| 0.30 | 86.7 |
| 0.40 | 88.9 |
| 0.50 | 87.2 |
| 0.60 | 87.7 |
| 1.00 | 88.2 |

A similar accelerating effect was obtained when beta piperidinopropionitrile was prepared from piperidine and acrylonitrile and used instead of piperidine in the synthesis of acrylonitrile-butadiene copolymers.

EXAMPLE 6

Three experiments were carried out simultaneously using the recipe as given in Example 1, except that methyl acrylate was used instead of acrylonitrile. The ratio of methyl acrylate to butadiene in the charge was 25/75. After 16 hours at 31° C., the following conversions were obtained.

| Per Cent Morpholine Used | Per Cent Conversion |
|---|---|
| 0. | 22.5 |
| 0.4 | 57.5 |
| 0.8 | 60.0 |

EXAMPLE 7

Two pressure bottle runs were made using the following recipes in order to demonstrate the efficacy of amine promoters in polymerization systems operated at a pH below 7.

|  | Run A | Run B |
|---|---|---|
|  | Parts | Parts |
| Water | 400 | 400 |
| Butadiene | 148 | 148 |
| Acrylonitrile | 52 | 52 |
| Dodecylamine Hydrochloride | 10 | 10 |
| Potassium Persulfate | 0.6 | 0.6 |
| Dodecyl Mercaptan | 1.0 | 1.0 |
| Morpholine | 0.0 | 0.2 |

A conversion of 34% was obtained in Run A while Run B, carried out at the same temperature and for the same time as Run A, gave a conversion of 64%.

EXAMPLE 8

A run was made in accordance with the recipe given in Example 1 without morpholine or $C_{12}$–$C_{14}$ mercaptan being present. A similar run was also made using 0.4% of morpholine. After 12 hours at 24° C. a conversion of 12% of the theoretical was obtained when neither mercaptan nor morpholine was present. The run containing 0.4% of morpholine but no mercaptan was 70.5% converted in the same time. This run shows that unlike the alkali cyanides, amines are excellent promoters in the absence of mercaptan modifiers.

EXAMPLE 9

A run was made in accordance with the recipe given in Example 1 using 0.4% of morpholine and further modified in that 0.5% of diisopropyl xanthogen disulfide was substituted for the 0.5% of $C_{12}$–$C_{14}$ mercaptan. Conversion was 68% after 14¾ hours at 24° C. as compared to less than 40% when the diisopropyl xanthogen disulfide was used without the morpholine promoter.

EXAMPLE 10

A number of runs were made to determine the effect of several different amines upon the copolymerization of butadiene and acrylonitrile. The recipe was the same as in example except that the amines listed in the Table VI were used instead of morpholine. The results obtained are summarized in the following table:

TABLE VI

*Promoters in the synthesis of butadiene-acrylonitrile copoylmers*

| Concentration Per Cent on Monomers | 0 | 0.5 | .15 | .2 | .3 | .4 | .6 | .8 | 1.0 | Temp., °C. | Time, Hours |
|---|---|---|---|---|---|---|---|---|---|---|---|
| Diethylaminoethanol | 56.5 | [1]72 |  | [1]83.5 |  | [1]95 |  |  | [1]98 | 24.5–26 | 14¾ |
| Ethylamine | 54 |  | 89 |  | 93 |  |  |  |  | 24–26.5 | 14¾ |
| Diethylamine | 54 |  |  |  |  | [1]91 |  | [1]100 |  | 24–26.5 | 14¾ |
| Triethylamine | 54 |  |  |  |  | [1]82.5 |  | [1]96 |  | 24–26.5 | 14¾ |
| N-propylamine | 54 |  |  |  |  | [1]80.5 |  |  |  | 25–28 | 14¾ |
| Di-iso-propylamine | 54 |  |  |  |  | [1]67 |  |  |  | 25–28 | 14¾ |
| Butylamine | 56.5 |  |  |  | 73 |  | 82 |  |  | 24.5–26 | 14½ |
| Dibutylamine | 56.5 |  |  |  |  | [1]58 |  | [1]56 |  | 24.5–26 | 14½ |
| Tributylamine | 56.5 |  |  |  |  | [1]51 |  | [1]46 |  | 24.5–26 | 14½ |
| n-octylamine | 56.5 |  |  |  |  | [1]58 |  |  |  | 25–28 | 14¾ |
| Lauryl amine | 54 |  |  |  |  | [1]53 |  |  |  | 25–28 | ........ |

[1] Molecular equivalent to piperidine at concentration indicated.

It may readily be seen from this table that diethylaminoethanol, ethylamine, diethyl amine, triethyl amine, n-propyl amine and n-butyl amine gave good promoting effects. The higher alkyl amines such as dibutyl amine, tributyl amine, n-octylamine and lauryl amine gave no promoting effect and in some cases acted as definite poisons to the reaction.

The amine promoters of the present invention are also valuable when preparing resins such as polyacrylonitrile, polyacrylates, polymethacrylates, polyvinyl ketones, polyvinyl ethers and the like from monoolefinic materials containing a highly polar group such as a —CN, —CO— or —COOR group wherein R is a lower alkyl group such as methyl, ethyl, propyl, or the like. This is clearly demonstrated by the following example.

EXAMPLE 11

The polymerization described in Example 1 was carried out using acrylonitrile alone as the reactant. A yield of 27.5% of polyacrylonitrile was obtained after 16 hours at 21° C. When 0.1% of morpholine was included in the recipe, the conversion was 85% and with 0.4% of morpholine the conversion was 98% after 16 hours at 21° C.

The foregoing description contains a limited number of embodiments of the present invention. It will be understood, however, that the latter is not limited to the specific details disclosed since numerous variations are possible without departing from the scope of the following claim:

What I claim and desire to secure by Letters Patent is:

The process of preparing a synthetic rubberlike material which comprises emulsifying a mixture of a major proportion of a conjugated butadiene hydrocarbon and a minor proportion of acrylonitrile in water in the presence of an alkali metal soap of a high molecular weight fatty acid as emulsifier, potassium persulfate as a polymerization catalyst, and an aliphatic mercaptan containing at least 6 carbon atoms and adding thereto 0.05 to 0.5% of morpholine.

GEORGE E. SERNIUK.

REFERENCES CITED

The following references are of record in the file of this patent:

UNITED STATES PATENTS

| Number | Name | Date |
|---|---|---|
| 2,260,475 | Murke | Oct. 28, 1941 |
| 2,281,613 | Wollthan | May 5, 1942 |
| 2,300,920 | Heuer | Nov. 3, 1942 |
| 2,305,025 | Muhlhausen | Dec. 15, 1942 |
| 2,306,411 | Schoenfeld | Dec. 29, 1942 |
| 2,376,015 | Semon | May 15, 1945 |
| 2,380,476 | Stewart | July 31, 1945 |
| 2,380,591 | Fryling | July 31, 1945 |
| 2,380,905 | Stewart | July 31, 1945 |
| 2,393,133 | White | Jan. 15, 1946 |
| 2,393,438 | Weisberg | Jan. 22, 1946 |